United States Patent Office 3,478,055
Patented Nov. 11, 1969

3,478,055
**PRODUCTION OF OPTICALLY ACTIVE
N-ACYLPROLINES AND PROLINES**
Toshio Shirakura, Hiroshi Yoshikawa, Masataka Shibasaki, and Chikara Hongo, Osaka-fu, Japan, assignors to Tanabe Seiyaku Co., Ltd., Osaka, Japan
No Drawing. Filed June 14, 1967, Ser. No. 645,882
Claims priority, application Japan, June 15, 1966, 41/39,000
Int. Cl. C07d 27/04
U.S. Cl. 260—326.3                    6 Claims

ABSTRACT OF THE DISCLOSURE

Process for the preparation of an optically active N-acylproline of which the acyl moiety is monochloroacetyl, n-butyryl or isobutyryl which comprises cooling a supersaturated solution of the optically active N-acylproline containing its optical antipode and collecting the optically active N-acylpyroline selectively crystallized, when desired, followed by hydrolysis of the collected optically active N-acylproline to the corresponding optically active proline.

---

The present invention relates to production of optically active N-acylprolines and prolines.

Optically active prolines, i.e. D-proline and L-proline, are each a valuable substance in the field of biochemistry. Particularly, L-proline is important from the dietetic viewpoint.

For the industrial production of those optically active prolines, there has heretofore been utilized the hydrolysis of natural protein. Any known method based on the optical resolution of DL-proline is of no practical use.

It has now been found that certain kinds of N-acyl-DL-prolines can be optically resolved into each of their optically active components, i.e. N-acyl-D-prolines and N-acyl-L-prolines, with favorable yields when crystallized from their solutions. Said N-acyl-DL-prolines are readily prepared from DL-proline by per se conventional acylation procedures. Obtained optically active N-acyl components are easily converted into the corresponding optically active prolines by per se conventional hydrolysis procedures. An advantageously and practically applicable route for the production of optically active prolines from their racemic modification has thus been materialized.

In this connection, it may be noted that the said beneficial property is not common to all of N-acyl-DL-prolines and can be presently seen only in N-monochloroacetyl, N-n-butyryl and N-isobutyryl compounds. Thus, the significance of the acyl moiety of N-acylprolines in the present invention is restricted to N-monochloroacetyl, N-n-butyryl and N-isobutyryl. It may be also noted that the successful separation of each of optically active components can be accomplished not only from their equivalent mixture (i.e. racemic modification) but also from their non-equivalent mixture (both mixtures being hereinafter inclusively represented by the term "N-acyl DL-mixture"). Thus, the present invention may be generally applied for the selective isolation of N-acyl-D or L-prolines from their mixture.

Accordingly, a basic object of the present invention is to embody a process for the preparation of optically active N-acylprolines. Another object of this invention is to embody a process for the separation of each of optically active N-acylprolines from their racemic modification. A further object of the invention is to embody a method for the industrial production of optically active prolines. These and other objects will be apparent to those conversant with the art to which the present invention pertains from the subsequent description.

In accordance with the present invention, an optically active N-acylproline is obtained by cooling a supersaturated solution of the optically active N-acylproline containing its optical antipode and collecting the optically active N-acylproline selectively crystallized.

The starting N-acyl DL-mixture may be, for instance, prepared by reacting the corresponding free DL-mixture (i.e. a mixture of D-proline and L-proline) with a conventional acylating agent such as monochloroacetyl chloride, monochloroacetic anhydride, n-butyryl chloride, n-butyric anhydride, isobutyryl chloride or isobutyric anhydride. The thus prepared N-acyl DL-mixture may be employed in the present invention with or without separation from the reaction mixture.

Further, for instance, the N-acyl DL-mixture may be prepared by racemizing the corresponding optically active N-acylproline (i.e. an N-acyl-D or L-proline). The racemization is accomplished by heating the optically active N-acylproline above its melting point for a while (e.g. several minutes) in the presence of a catalytic amount of an acylating agent. Since the racemization can proceed irrespective of the kind of the acylating agent and without any unfavorable side reaction such as acyl interchange, the use of an inexpensive acylating agent (e.g. acetic anhydride) is recommended from the industrial viewpoint.

In the solution containing an optically active N-acylproline and its optical antipode, those optical isomers may be equivalent or non-equivalent in their amounts but at least the one to be preferentially crystallized should be present in a supersaturation amount. When the amounts are equivalent, the seeding with the seed crystal of the optical isomer desired to first crystallize is essential. When non-equivalent, such seeding is not essential because of the natural occurrence of the seed crystal. For assurance, however, the seeding is preferable also in the latter case. Thus, the optical isomer to be first crystallized exists in a larger amount than that of the other prior to crystallization from the supersaturated solution. The amount of the seed crystal may be in a small amount enough to induce crystallization.

As the solvent for the supersaturated solution, there may be used any one in which both of an N-acyl-D-proline and an N-acyl-L-proline are soluble and from which they are crystallizable without any chemical change. Examples of the preferred solvent are water, acetone and methyl ethyl ketone. These solvents may be employed alone or in combination. From the technical and economical viewpoints, acetone is the most preferable for the resolution of N-monochloroacetyl or N-isobutyryl DL-mixture and water for the resolution of N-n-butyryl DL-mixture.

The supersaturated solution may be prepared from a solution of the N-acyl DL-mixture in a suitable solvent by applying various conventional procedures including refrigeration, concentration, addition of appropriate solvents and addition of appropriate salting out agents. The said procedures may be applied also for the preparation of a supersaturated solution from the mother liquor after the recovery of the optical isomer primarily crystallized.

For dissolving the N-acyl DL-mixture in a suitable solvent, there may be effected heating at a temperature of up to the reflux temperature of the resulting solution. Crystallization of either one of the optically active components may be practiced by cooling the solution to a temperature down to its freezing point.

Since the solubility of the N-acyl DL-mixture, e.g. the racemic N-acylproline, sharply increases with raising the temperature above 30° C., the saturated temperature is preferably set below 40° C. The supercooling temperature range depends upon the saturated temperature of the N-acyl DL-mixture. When it is saturated at a higher temperature, the supercooling temperature range is narrow. On the contrary, when saturated at a lower temperature, the supercooling temperature range is wide. For example, the increase of the solubility of N-n-butyryl-DL-proline in water with raising the temperature above 30° C. is greater than that of its optical component. Namely, the amount of N-n-butyryl-DL-proline dissolved in 100 g. of water is 26.8 g. and 153.2 g. respectively at 30° C. and 40.1° C., whereas the amount of N-n-butyryl-L-proline dissolved in 100 g. of water is 7.8 g. and 11.0 g. respectively at 30° C. and 40.1° C. Therefore, the optical resolution is efficiently performed at the supercooling of 4° C. when the racemic modification is saturated at 34° C. and the supercooling of 7° C. when the racemic modification is saturated at 30° C. The cooling rate is preferred to be more than 1° C. per hour.

In the present invention, it is advantageous that the resolution of the N-acyl DL-mixture can be accomplished in a good yield. For instance, the net yield of N-n-butyryl-L-proline from N-n-butyryl-DL-proline by a single operation under the said condition reaches about 14%, irrespective of the saturated temperature. It is also advantageous that the strict regulation of the supercooling condition is not absolutely necessary; the optical resolution may be smoothly conducted even at higher supercoolings by separating the solid quickly from the mother liquor.

The mother liquor obtained after the isolation of one optical component may be employed for the optical resolution of the other enantiomorph with or without the previous addition of the N-acyl DL-mixture. Thus, the other optical component may be separated from the mother liquor by fractional crystallization. These operations may be repeatedly and alternatively effected. The crystals obtained by the said fractional crystallization are of high purity and, on a single recrystallization, afford a pure material of the optically active N-acylproline.

The thus obtained optically active N-acylproline may be hydrolyzed to the corresponding optically active proline. The hydrolysis can be executed by a conventional manner, e.g. heating with a mineral acid such as hydrochloric acid, hydrobromic acid or sulfuric acid. The reaction mixture is usually concentrated, neutralized and treated with ion-exchange resin to give the crystals of the optically active proline in a high purity.

Practical embodiments of the present invention are illustratively shown in the following examples.

EXAMPLE 1

To a solution of 11.5 g. of DL-proline in 50 ml. of 2 N sodium hydroxide, there are dropwise added while ice-cooling with vigorous agitation 12.1 g. of monochloracetyl chloride and 70 ml. of 2 N sodium hydroxide alternatively in ten portions. The reaction mixture is made acidic with hydrochloric acid and extracted with 400 ml. of ethyl acetate. The extract is dried over anhydrous sodium sulfate and the ethyl acetate is removed by evaporation. After the monochloroacetic acid present in the syrupy residue is removed by extraction with petroleum ether, the residue is dissolved in 20 ml. of acetone. The solution is decolorized with 0.5 g. of activated charcoal and filtered. The filtrate is seeded with 5 mg. of N-monochloroacetyl-L-proline (M.P., 115 to 119.5 C.; $[\alpha]_D^{18}$ −109° (c.=1, water)) and about 10 ml. of ether are added thereto. The resulting mixture is allowed to stand at −20° C. for 1 day. The crystals which precipitate are collected by filtration and dried to give 4.4 g. of N-monochloroacetyl-L-proline (M.P., 118 to 120° C.; $[\alpha]_D^{18}$ −110° (c.=1, water)). The crystals are optically pure.

A mixture of 1.9 g. of the said crystals and 10 ml. of 2 N hydrochloric acid is heated at 105° C. for 4 hours and then diluted with water to about 200 ml. The resulting solution is passed through a column packed with a strongly acidic ion-exchange resin, Amberlite IR-120. The column is washed well with water and then eluted with aqueous ammonia to liberate L-proline. The eluate is evaporated to dryness to give 1.1 g. of L-proline, $[\alpha]_D^{18}$ −86° (c.=2, water).

The mother liquor obtained after the isolation of N-monochloracetyl-L-proline is allowed to stand at room temperature for 1 day. There appear many large crystals, each weighing about 100 mg. The crystals are collected by filtration and dried to give 3.0 g. of N-monochloroacetyl-D-proline (M.P., 118 to 120° C.; $[\alpha]_D^{18}$ +109° (c.=0.78, water)). The crystals are optically pure.

Hydrolysis of 1.9 g. of the said crystals with 10 ml. of 2 N hydrochloric acid and work-up of the reaction mixture in the same manner as adopted for N-monochloroacetyl-L-proline give 1.1 g. of D-proline, $[\alpha]_D^{18}$ +85.5° (c.=2, water).

EXAMPLE 2

A mixture of 68.5 g. of N-monochloroacetyl-DL-proline (M.P., 88° C.; $[\alpha]_D^{18}$ 0° (c.=1, water)) and 78.6 g. of acetone is heated until solution is complete. The resulting solution is maintained at 40° C. and seeded with 0.2 g. of N-monochloroacetyl-L-proline. The fractional crystallization is effected by cooling the resulting mixture at a rate of 10° C. per hour while stirring. When the temperature of the mixture falls to 21° C. in about 110 minutes after the seeding, the crystals which precipitate are collected by filtration and dried to give 4.7 g. of N-monochloroacetyl-L-proline, $[\alpha]_D^{18}$ −105° (c.=1, water). The optical purity of the crystals is 95.5%.

Hydrolysis of 1.9 g. of the said crystals with 10 ml. of 2 N hydrochloric acid and work-up of the reaction mixture in the same manner as in Example 1 give 1.1 g. of L-proline, $[\alpha]_D^{18}$ −82° (c.=2, water).

To the mother liquor obtained after the isolation of N-monochloroacetyl-L-proline, there are added 9.0 g. of N-monochloroacetyl-DL-proline and some acetone, and the mixture is heated until solution is complete. The resulting solution is kept at 40° C., seeded with 0.1 g. of N-monochloroacetyl-D-proline and then cooled slowly with stirring. When the temperature of the mixture falls to 21° C. in about 100 minutes after the seeding, the crystals which precipitate are collected by filtration and dried to give 10.5 g. of N-monochloroacetyl-D-proline, $[\alpha]_D^{18}$ +99° (c.=1, water). The optical purity of the crystals is 90.0%.

The crystals are recrystallized from acetone, and 1.9 g. of the purified crystals are hydrolyzed in the same manner as in Example 1 to give 1.1 g. of D-proline, $[\alpha]_D^{18}$ +86° (c.=2, water). The D-proline thus prepared is optically pure.

EXAMPLE 3

A solution of 12.15 g. of N-monochloroacetyl-DL-proline in 30 ml. of acetone is maintained at 30° C. and seeded with 0.10 g. of N-monochloroacetyl-L-proline. The resulting mixture is allowed to stand at 20° C. for 18 hours. The crystals which precipitate are collected by filtration and dried to give 1.00 g. of N-monochloroacetyl-L-proline, $[\alpha]_D^{18}$ −110° (c.=1, water). Hydrolysis of 1.9 g. of the crystals with 10 ml. of 2 N hydrochloric acid and work-up of the reaction mixture in the same manner as in Example 1 give 1.1 g. of L-proline, $[\alpha]_D^{18}$ −85.5° (c.=2, water).

EXAMPLE 4

An unseeded solution of 12.15 g. of N-monochloroacetyl-DL-proline and 3.23 g. of N-monochloroacetyl-L-proline in 30 ml. of acetone is allowed to stand at 20° C. for 18 hours. The crystals which precipitate are collected by filtration and dried to give 4.15 g. of N-monochloroacetyl-L-proline, $[\alpha]_D^{18}$ −110° (c.=1, water). Hydrolysis of 1.9 g. of the crystals with 10 ml. of 2 N hydrochloric acid and work-up of the reaction mixture in the same manner as in Example 1 give 1.1 g. of L-proline, $[\alpha]_D^{18}$ −86° (c.=2, water).

EXAMPLE 5

A mixture of 26.8 g. of N-n-butyryl-DL-proline (M.P., 87 to 88° C.; $[\alpha]_D^{18}$ 0° (c.=1, water)) and 100 g. of water is heated until solution is complete. The resulting solution is maintained at 30° C. and seeded with 1.0 g. of N-n-butyryl-L-proline (M.P., 114 to 115.5° C.; $[\alpha]_D^{18}$ —101° (c.=1, water)). The resulting mixture is then cooled with stirring to 21° C. in about 12 minutes. The crystals which precipitate are collected by filtration and dried to give 6.2 g. of N-n-butyryl-L-proline, $[\alpha]_D^{18}$ —53.8° (c.=1, water). The optical purity of the crystals is 53.3%.

A mixture of 1.85 g. of the said crystals and 10 ml. of 2 N hydrochloric acid is heated at 105° C. for 5 hours and then diluted with water to about 200 ml. The resulting solution is passed through a column packed with a strongly acidic ion-exchange resin, Amberlite IR–120. The column is washed well with water and eluted with aqueous ammonia to liberate L-proline. The eluate is evaporated to dryness to give 1.1 g. of L-proline, $[\alpha]_D^{18}$ —45.5° (c.=2, water).

The mother liquor obtained after the isolation of N-n-butyryl-L-proline is warmed to 32° C. and then allowed to stand at 22° C. for 3 hours with occasional agitation. The crystals which precipitate are collected by filtration, washed with a small amount of water and dried to give 2.6 g. of N-n-butyryl-D-proline, $[\alpha]_D^{18}$ +101° (c.=1, water). The crystals are optically pure N-n-butyryl-D-proline.

Hydrolysis of 1.85 g. of the said crystals with 2 N hydrochloric acid and work-up of the reaction mixture in the same manner as adopted for N-n-butyryl-L-proline give 1.1 g. of D-proline, $[\alpha]_D^{18}$ +86° (c.=2, water).

EXAMPLE 6

A mixture of 134 g. of N-n-butyryl-DL-proline and 500 g. of water is heated until solution is complete. The solution is maintained at 30° C., seeded with 1.0 g. of N-n-butyryl-L-proline and then cooled with stirring. The resulting mixture is worked up in the same manner as in Example 5 to fractionally crystallize N-n-butyryl-L-proline. The mother liquor is admixed with N-n-butyryl-DL-proline and water so as to make the amounts of the racemic modification and of water equal to those in the said first operation. The mixture is heated until solution is complete and seeded with 0.1 g. of N-n-butyryl-D-proline to fractionally crystallize the enantiomorph. The above operations are repeated ten times whereby N-n-butyryl-L-proline and N-n-butyryl-D-proline are alternatively obtained as shown in the following table:

The mother liquor obtained after the isolation of crystals in the tenth run is admixed with water to make the total amount of water 500 g. and 98.5 g. of N-n-butyryl-L-proline, i.e., the total amount of the L-form separated in the ten runs, are added thereto. The resulting mixture is heated until solution is complete and then maintained at 27.5° C. for 2 hours with stirring. The crystals which precipitate are collected by filtration, washed with water and dried to give 84.0 g. of N-n-butyryl-L-proline (M.P., 114 to 115.5° C.; $[\alpha]_D^{18}$ —101° (c.=1, water)). The crystals are optically pure.

The mother liquor obtained after the isolation of the said N-n-butyryl-L-proline is a solution of the almost pure racemic modification as indicated by its specific rotation of about zero.

Hydrolysis of 18.5 g. of the thus-prepared N-n-butyryl-L-proline with 100 ml. of 2 N hydrochloric acid and work-up of the reaction mixture in the same manner as in Example 5 give 11.0 g. of L-proline, $[\alpha]_D^{18}$ —86° (c.=2, water). The L-proline obtained is optically pure.

EXAMPLE 7

To the mother liquor obtained in Example 6, there are added N-n-butyryl-DL-proline and N-n-butyryl-L-proline to make a mixture consisting of 200 g. of the racemic modification, 15 g. of the L-form and 500 g. of water. The mixture is heated until solution is complete, then maintained at 34° C. and seeded with 0.1 g. of N-n-butyryl-L-proline. The resulting mixture is rapidly cooled to 30° C. with stirring and maintained at the same temperature. The crystals which precipitate in 45 minutes after the seeding are collected by filtration and dried to give 29.5 g. of N-n-butyryl-L-proline $[\alpha]_D^{18}$ —90.4°. The optical purity of the crystals is 89.5%.

Hydrolysis of 18.5 g. of the said crystals with 2 N hydrochloric acid in the same manner as in Example 5 gives 11.0 g. of L-proline, $[\alpha]_D^{18}$ —76.0° (c.=2, water).

EXAMPLE 8

A mixture of 10.9 g. of N-isobutyryl-DL-proline (M.P., 85 to 86° C.; $[\alpha]_D^{18}$ 0° (c.=1, water)) and 20 ml. of acetone is heated until solution is complete, then maintained at 20° C. and seeded with 0.1 g. of N-isobutyryl-L-proline (M.P., 123 to 124° C.; $[\alpha]_D^{18}$ —104° (c.=1, water)). The resulting mixture is allowed to stand at 20° C. for 24 hours, and the crystals which precipitate are collected by filtration and dried to give 0.37 g. of N-isobutyryl-L-proline, $[\alpha]_D^{18}$ —99.0° (c.=1, water). The optical purity of the crystals is 95.3%.

Hydrolysis of 0.37 g. of the said crystals with 2 ml. of 2 N hydrochloric acid and work-up of the reaction mixture in the same manner as in Example 5 give 0.22 g. of L-proline, $[\alpha]_D^{18}$ —81.5° (c.=2, water).

What is claimed is:

1. A process for the preparation of an optically active N-acrylproline of which the acyl moiety is monochloro-acetyl, n-butyryl or isobutyryl which comprises cooling a supersaturated solution of the optically active N-acrylproline containing its optical antipode, where the optically active N-acylproline exists in a larger amount than that of said optical antipode, and collecting the crystallized optically active N-acylproline.

2. The process according to claim 1, followed by hydrolysis of the collected optically active N-acylproline in a per se conventional manner to give the corresponding optically active proline.

3. The process according to claim 1, in which a supersaturated solution of the corresponding racemic modifi-

TABLE

| Number of resolution run | Kind of enantiomorph isolated | Crystallization time, min. | Liquid temperature at filtration, °C. | Yield, g. | Optical purity, percent | Yield of pure form, g. | Net yield of pure form separated, g. |
|---|---|---|---|---|---|---|---|
| 1 | L | 28 | 23.0 | 18.4 | 43.9 | 8.1 | 7.1 |
| 2 | D | 31 | 21.6 | 18.5 | 79.1 | 14.7 | 14.6 |
| 3 | L | 25 | 23.0 | 16.1 | 99.1 | 16.0 | 15.9 |
| 4 | D | 23 | 23.0 | 18.9 | 95.2 | 18.0 | 17.9 |
| 5 | L | 22 | 21.8 | 27.1 | 70.6 | 19.1 | 19.0 |
| 6 | D | 18 | 22.0 | 23.0 | 73.8 | 17.0 | 16.9 |
| 7 | L | 35 | 23.5 | 21.7 | 85.4 | 18.5 | 18.4 |
| 8 | D | 35 | 23.3 | 23.4 | 72.5 | 17.0 | 16.9 |
| 9 | L | 50 | 25.2 | 15.2 | 93.6 | 14.2 | 14.1 |
| 10 | D | 60 | 25.5 | 17.3 | 98.8 | 17.1 | 17.0 | cation is seeded with the seed crystal of the optically active N-acrylproline and then cooled.

4. The process according to claim 3, followed by hydrolysis of the collected optically active N-acylproline in a per se conventional manner to give the corresponding optically active proline.

5. The process according to claim 1, in which a supersaturated solution of the optically active N-acylproline containing its optical antipode, where the optically active N-acylproline exists in a larger amount than that of said optical antipode, is seeded with the seed crystal of the optically active N-acylproline and then cooled.

6. The process according to claim 5, followed by hydrolysis of the collected optically active N-acylproline in a per se conventional manner to give the corresponding optically active proline.

References Cited

Chemical Abstracts, Garmaise et al., vol. 55 (1961), p. 5365.

ALEX MAZEL, Primary Examiner

B. I. DENTZ, Assistant Examiner

U.S. Cl. X.R.

260—707